United States Patent [19]

Modes

[11] Patent Number: 4,467,512

[45] Date of Patent: Aug. 28, 1984

[54] EXPANDER TOOL

[76] Inventor: Edward E. Modes, 1417 Shawnee Trail, Deerfield, Ill. 60015

[21] Appl. No.: 345,236

[22] Filed: Feb. 3, 1982

[51] Int. Cl.[3] .......... B23P 19/04

[52] U.S. Cl. .......... 29/237; 29/268; 81/302

[58] Field of Search .......... 29/237, 239, 238, 280, 29/268; 269/902; 81/302, 119

[56] References Cited

U.S. PATENT DOCUMENTS

| | | | |
|---|---|---|---|
| D. 28,380 | 3/1898 | Stortz | 81/119 |
| 2,373,478 | 4/1945 | Kuhn . | |
| 2,656,597 | 10/1953 | Arthur . | |
| 3,233,313 | 2/1966 | Roth . | |
| 3,390,561 | 7/1968 | Finck | 29/280 |
| 3,540,106 | 11/1970 | Goldman | 81/302 |
| 3,677,129 | 7/1972 | Lyon . | |
| 3,980,287 | 9/1976 | Nilsson | 269/902 |
| 3,990,137 | 11/1976 | Kulba et al. . | |
| 4,198,738 | 4/1980 | Wallace | 29/268 |
| 4,257,135 | 3/1981 | Moebius | 29/237 |

*Primary Examiner*—James L. Jones, Jr.
*Attorney, Agent, or Firm*—Niro, Daleiden & Jager

[57] ABSTRACT

An expander tool such as for use in removing tubing from barbed fittings. The tool includes a pair of handle members having a pivotal connection therebetween. A pair of channel-shaped jaw members are operatively connected to the handle members for spreading movement in a generally parallel direction when the handle members are moved toward each other. The channel-shaped jaw members are nested with the bight portions thereof being thin and flat and in generally parallel confronting relation. The legs of the channel-shaped jaw members therefore are in overlapped relation whereby the opposite side of the thin flat bight portion of one jaw member can be positioned in close proximity to a workpiece such as the flange or elbow of a barbed fitting. The thin flat bight portions of the jaw members have slots opening outwardly of the tool, the slots each having a stepped configuration for embracing different sizes of workpieces, such as different diameters of tubing and barbed fittings.

12 Claims, 4 Drawing Figures

FIG. 1
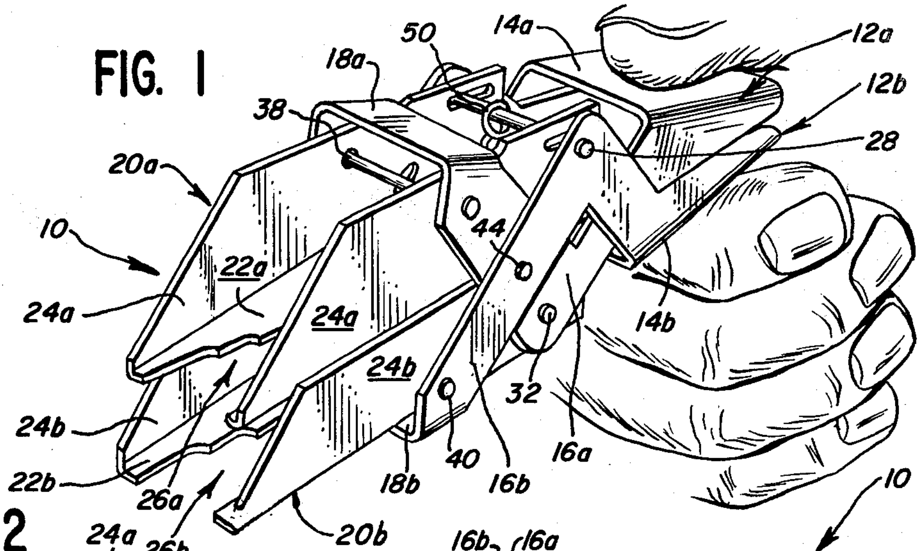
FIG. 2
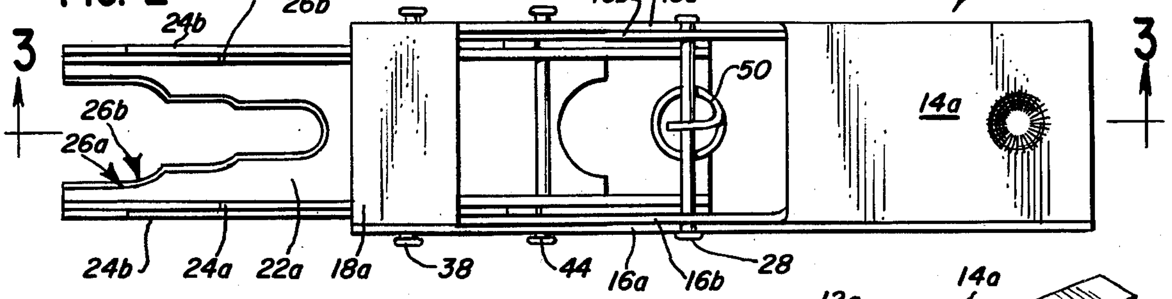
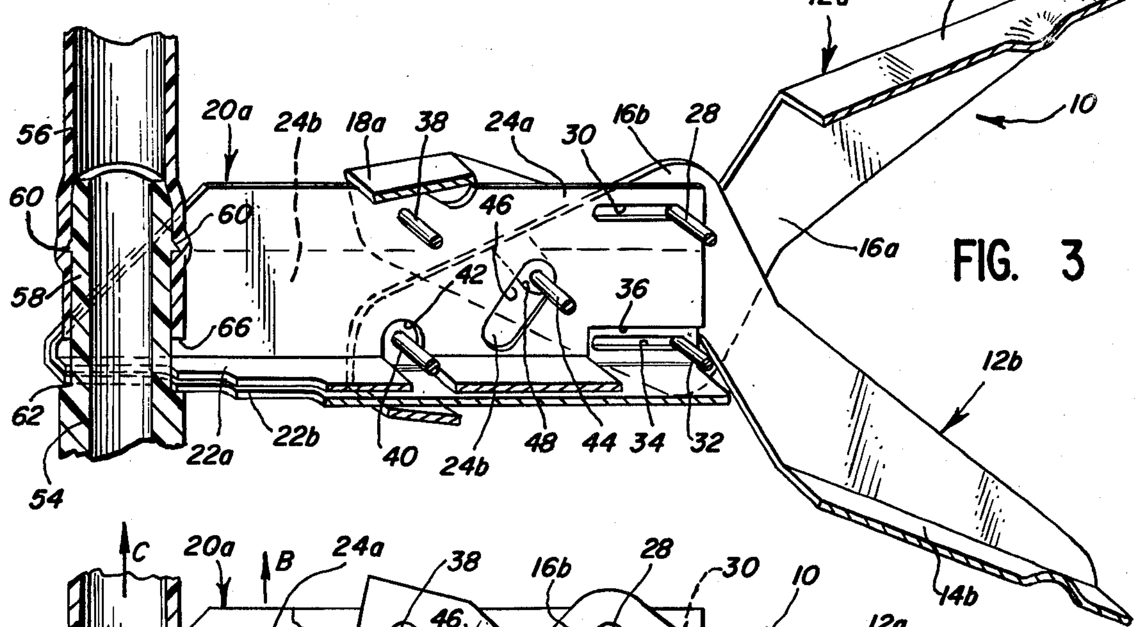
FIG. 3
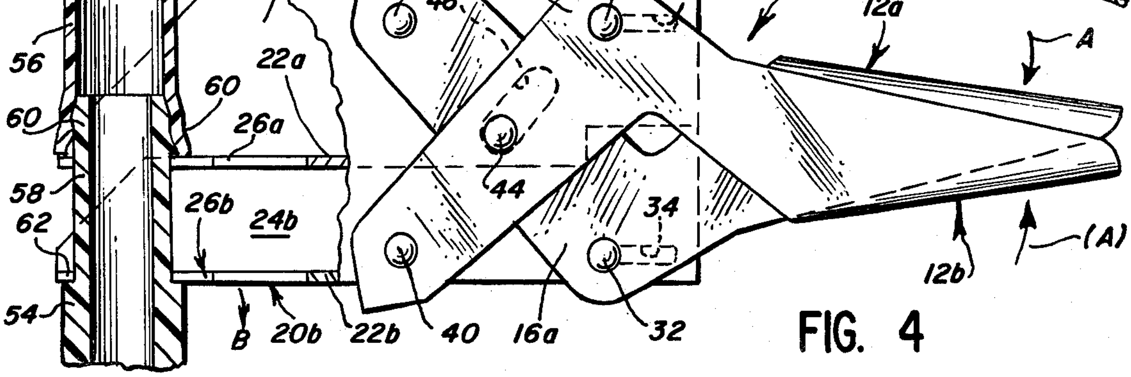
FIG. 4

EXPANDER TOOL

BACKGROUND OF THE INVENTION

This invention relates to an expander tool and particularly to such a tool which is adapted for removing plastic tubing from barbed fittings. Fittings for plastic or similar tubing normally comprise a cylindrical member fabricated of brass or other appropriate material. Opposite ends of the fitting may have different diameter tubular portions for receiving different diameters of tubing. An outwardly projecting peripheral flange normally is disposed intermediate the ends of the fitting. The different diameter ends of the fitting have integral ring-like barbs spaced from the ends of the fittings and spaced from the intermediate flange. Plastic tubing is forced onto the ends of the fitting, over the barbs, to make connection with the fitting. It is practically impossible to remove properly fitted plastic tubing from such barbed fittings by simply pulling on the tubing in a direction away from the fitting. Such pulling action normally causes the tubing to fail in tension because of the locking action of the fitting barbs against removal. Often the plastic tubing is removed from the fitting by slitting the tubing lengthwise which, of course, destroys a length of the tubing. If the tubing has been properly sized, in length, this would require discarding the entire length of tubing. More importantly, such slitting may score the shank and barb of the fitting and cause leakage if the fitting is reused.

The present invention is directed to solving this continually perplexing problem.

SUMMARY OF THE INVENTION

An object, therefore, of the present invention is to provide a new and improved expander tool, and,particularly, to a tool which is useful in removing plastic tubing from barbed fittings, or other equally useful applications.

In the exemplary embodiment of the invention, the expander tool includes a pair of handle members having a pivotal connection therebetween. A pair of jaw members are operatively connected to the handle members for spreading movement when the handle members are moved toward each other. The jaw members each include a thin flat portion for engaging a workpiece with the thin flat portions in generally parallel confronting relation. Each jaw member has bracing means for the thin flat portion thereof. The bracing means project from the same sides of the thin flat portions in overlapping relation whereby the opposite side of the thin flat portion of one of the jaw members can be positioned in close proximity to a workpiece.

In the embodiment of the invention disclosed herein, the handle members and jaw members are fabricated of sheet metal material. The jaw members are channel-shaped with bight portions forming the thin flat workpiece engaging portions of the tool. The leg portions of the channel-shaped jaw members form the overlapping brace means. In other words, the channel-shaped jaw members are in nested or telescoped relation.

Another feature of the invention is that the thin flat workpiece engaging portions of the jaw members have workpiece embracing slots opening outwardly of the tool for sliding engagement with a workpiece, such as a barbed fitting. The slots each have a stepped configuration for embracing different sizes of workpieces, such as different diameters of barbed fittings and, accordingly, different diameters of tubing.

Other objects, features and advantages of the invention will be readily apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of the expander tool of the present invention;

FIG. 2 is a top plan view, on an enlarged scale, of the tool of FIG. 1;

FIG. 3 is a sectional view taken generally along the line 3—3 of FIG. 2, with the tool in closed condition and embracing a barbed fitting; and FIG. 4 is a view similar to that of FIG. 3 with the tool in expanded condition removing a length of tubing from the barbed fitting.

DETAILED DESCRIPTION OF THE INVENTION

Referring to the drawings in greater detail, and first to FIGS. 1 and 2, an expander tool, generally designated 10, is shown in accordance with the teachings of the present invention. The tool includes a pair of handle members generally designated **12*a* and 12*b*. Each handle member includes a finger engaging portion 14*a*, 14*b* extending across the rear end of the tool, generally V-shaped side brace portions 16*a*, 16*b* in overlapped relation, and front brace portions 18*a*, 18*b*. The handles are fabricated of sheet metal material and are identical in size and shape for economy in tooling, with the side braces 16*a*, 16*b*** overlapping in alternate fashion on opposite sides of the tool as shown in FIG. 2. The handles are pivotally connected as described hereinafter.

A pair of jaw members, generally designated **20*a* and 20*b* are operatively connected to handle members 12*a*, 12*b* for spreading movement when the handle members are moved toward each other as described in greater detail hereinafter. The handle members are fabricated of sheet metal material and are channel-shaped as best seen in FIG. 1 so that jaw member 20*a* nests or telescopes within jaw member 20*b***.

More particularly, each channel-shaped jaw member has a bight portion **22*a*, 22*b* which is thin, flat and in generally parallel confronting relation. Each jaw member has parallel leg portions 24*a*, 24*b* which provide bracing means for the thin flat bight portions, with the leg-bracing portions overlapping and projecting from the same sides of the thin flat bight portions. With this construction, the opposite side of the thin flat bight portion 22*b* of jaw member 20*b*** can be positioned in close proximity to a workpiece such as the flange of a barbed fitting as described in greater detail hereinafter.

A feature of the invention is the provision of workpiece embracing slots, generally designated **26*a* and 26*b* in the bight portions 22*a* and 22*b*, respectively, opening outwardly or frontwardly of the tool. As seen best in FIG. 2, the slots have a stepped configuration for embracing different sizes of workpieces such as different diameters of barbed fittings. As can be seen, the tool disclosed herein has three steps of reducing widths, but it is to be understood that other appropriate stepped configurations are contemplated. It also can be seen that the stepped slot 26a of jaw member 20a is slightly enlarged relative to stepped slot 26b**. This is to provide clearance for the barbs of the fitting as described hereinafter.

Referring to FIGS. 3 and 4 in addition to FIGS. 1 and 2, the pivotal connection between the handle members, between the jaw members, and between each other comprise a plurality of pins and slots which provide a parallelogram structure to effect parallel action of jaw members 20a, 20b in response to closing and opening of handle members 12a, 12b. More particularly, a pin 28 is fixed to and extends between brace portions 16b of handle 12b. Pin 28 extends through and slides within elongated slots in legs 24a of jaw member 20a. To this end, legs 24a of jaw member 20a are taller than the legs of jaw member 20b. A pin 32 is fixed to and extends between side braces 16a of handle member 12a. Pin 32 extends through and slides within elongated slots 34 in legs 24b of jaw member 20b. To this end, it can be seen in FIG. 3 that legs 24a of jaw member 20a are cut out at 36 to accommodate movement of pin 32. A third pin 38 is fixed to and extends between a forward portion of side braces 16a of handle 12a beneath cross brace 18a of the handle. Pin 32 extends through legs 24a of jaw member 20a and is capable of only rotational movement relative thereto. Similarly, a fourth pin 40 extends between and is fixed to side braces 16b of handle member 12b and extends through legs 24b of jaw member 20b with only rotational movement relative thereto. As can be seen in FIG. 3, notches 42 are formed in legs 24a of jaw member 20a to accommodate pin 40. Lastly, a fifth, pivot pin 44 is fixed to and extends between side braces 16a of handle member 12a and rotationally through side braces 16b of handle member 12b. Enlarged cutouts 46 and 48 are formed in legs 24a and 24b, respectively, of jaw members 20a and 20b, respectively, to accommodate free relative movement of pin 44. With this pin and slot arrangement, closing movement of handles 12a, 12b in the direction of arrows A (FIG. 4) causes opening or expanding movement of the jaw members in the direction of arrows B in a parallel action.

A coil spring 50 (FIGS. 1 and 2) effects return movement of the handle members to open condition and the jaw members to closed condition.

Referring to FIGS. 3 and 4, one end of a typical barbed fitting 54 is shown with a section of plastic tubing 56 telescoped thereover. FIG. 3 shows the plastic tubing securely connected to the fitting. FIG. 4 shows the plastic tubing being removed by the expander tool 10 of the present invention. More particularly, the fitting has a given diameter end 58 for accommodating the tubing. An integral ring barb 60 surrounds fitting end 58 circumferentially thereabout. It can be seen that the barb is angled on the outer side thereof to facilitate relatively easy assembly of the tubing onto the fitting end 58, but the barb is flattened on the inner side thereof creating a sharp peripheral edge to prevent removal of the tubing. The fitting has a flange forming a shoulder 62 facing toward and spaced inwardly of barb 60. It is to be understood that the opposite end of the fitting, not shown, is similarly constructed but normally will have a different diameter barbed end.

In operation, FIG. 3 shows the expander tool of the present invention with the slotted thin flat bight portions 22a, 22b of the jaw members embracing fitting end 58 between flange shoulder 62 and the distal end 66 of tubing 56. Of course, depending on the diameter of fitting end 58, the fitting may be embraced by different steps of the slots. FIG. 4 shows the tool with the handle members moved toward each other in the direction of arrows A, with the jaw members spread or expanded to force tubing 56 off of fitting 54 in the direction of arrow C. With stepped slot 26a of jaw member 20a being slightly enlarged, the stepped slot can clear barb 60 to completely effect removal of the tubing. An important phenomenon to understand with the operation of the present invention is that whereas longitudinal pulling on tubing 56 to remove the tubing from the barbed fitting will actually cause the tubing to contract and tighten more securely onto the barbed fitting, the expanding action of the tool by applying compression to the distal end 66 of the tubing actually causes the tubing itself to expand in a radial direction and thereby loosen the secure locking engagement about the barb. The ease of removal of the tubing is remarkable once the action of the tool is started.

Lastly, it also should be understood that barbed fittings of the character described herein often are in the form of elbow constructions. Consequently, as can be seen best in FIG. 3, the underside of the tool can be placed in close proximity to such fittings or in close proximity to other extraneous structures. This is due to the fact that the channel-shaped jaw members are nested or telescoped with the side bracing legs thereof projecting from the same sides of the thin flat workpiece embracing portions of the tool. Although the tool is shown herein for application to barbed fittings for removing plastic tubing therefrom, it is to be understood that the novel features thereof may have other wide ranging applications.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:

1. An expander tool, comprising: a pair of handle members having a pivotal connection therebetween, and a pair of jaw members operatively connected to said handle members for spreading said jaw members when said handle members are moved toward each other, said jaw members being channel-shaped with thin flat bight portions for engaging a workpiece with the thin flat bight portions in generally parallel confronting relation and with generally parallel leg portions, said channel-shaped jaw members being nested with said leg portions in overlapped relation projecting from the same sides of the thin flat bight portions, whereby the opposite side of thin flat bight portion of one of said jaw members can be positioned in close proximity to a workpiece.

2. The expander tool of claim 1 wherein said thin flat portions have workpiece embracing slots opening outwardly of the tool.

3. The expander tool of claim 2 wherein said slots each have a stepped configuration for embracing different sizes of workpieces.

4. The expander tool of claim 1 wherein said jaw members are fabricated of sheet metal material.

5. The expander tool of claim 4 wherein said handle members also are fabricated of sheet metal material.

6. The expander tool of claim 1 wherein said pivotal connection for said handle members, and the connection between said jaw members include cooperating means providing for parallel movement of said jaw members and said thin flat bight portions thereof.

7. An expander tool for removing tubing from barbed fittings, or the like, comprising: a pair of handle members having a pivotal connection therebetween, and a pair of jaw members operatively connected to said handle members for spreading said jaw members in a parallel action when said handle members are moved toward each other, said jaw members each being channel-shaped with thin flat bight portions in generally parallel confronting relation for engaging a workpiece and with generally parallel leg portions, said channel-shaped jaw members being nested with said leg portions in overlapped relation projecting from the same sides of said thin flat bight portions, whereby the opposite side of the thin flat bight portion of one of said jaw members can be positioned in close proximity to a workpiece such as the flange or elbow of a barbed fitting.

8. The expander tool of claim 7 wherein said channel-shaped jaw members are fabricated of sheet metal material.

9. The expander tool of claim 7 wherein said handle members also are fabricated of sheet metal material.

10. The expander tool of claim 9 wherein the slot in the bight portion of the channel-shaped jaw member which is nested within the other jaw member is slightly enlarged in relation to the slot of the other jaw member.

11. An expander tool, comprising: a pair of handle members having a pivotal connection therebetween, and a pair of jaw members operatively connected to said handle members for spreading said jaw members when said handle members are moved toward each other, said jaw members each having workpiece embracing slots opening outwardly of the tool, said slots each having a stepped configuration for embracing different sizes of workpieces, said jaw members being channel-shaped with bight portions having said slots formed therein, the jaw members being nested with parallel leg portions in overlapped relation.

12. An expander tool, comprising: a pair of handle members having a pivotal connection therebetween, and a pair of jaw members operatively connected to said handle members for spreading said jaw members when said handle members are moved toward each other, said jaw members being channel-shaped with thin and flat bight portions with workpiece embracing slots therein opening outwardly of the tool, said slots each having a stepped configuration for embracing different sizes of workpieces, and said channel-shaped jaw members being nested with parallel leg portions in overlapped relation.

* * * * *